United States Patent
Gentile (10) Patent No.: US 8,967,115 B2
(45) Date of Patent: Mar. 3, 2015

(54) FRANCIS CYCLE BACKWARDS INJECTED ENGINE

(76) Inventor: Francis Xavier Gentile, Los Angeles, CA (US)

(*) Notice: Subject to any disclaimer, the term of this patent is extended or adjusted under 35 U.S.C. 154(b) by 1177 days.

(21) Appl. No.: 12/903,286

(22) Filed: Oct. 13, 2010

(65) Prior Publication Data
US 2011/0247584 A1 Oct. 13, 2011

Related U.S. Application Data

(63) Continuation-in-part of application No. 12/758,873, filed on Apr. 13, 2010, now Pat. No. 8,104,450.

(60) Provisional application No. 61/168,625, filed on Apr. 13, 2009.

(51) Int. Cl.
*F02B 47/02* (2006.01)
*F02M 69/04* (2006.01)
*F02B 25/00* (2006.01)
*F02M 7/00* (2006.01)
*F02M 25/07* (2006.01)

(52) U.S. Cl.
CPC ......... *F02M 69/042* (2013.01); *F02M 25/0752* (2013.01); *F02M 69/046* (2013.01); *Y02T 10/121* (2013.01)
USPC .......................................................... 123/298

(58) Field of Classification Search
USPC ........ 123/298, 65 PE, 65 EM, 65 P, 468–470, 123/472, 347, 65 R, 568.12, 25 C
See application file for complete search history.

(56) References Cited

U.S. PATENT DOCUMENTS

| | | | |
|---|---|---|---|
| 1,812,289 A | 6/1931 | Friedl | |
| 1,873,119 A | 8/1932 | Griswold | |
| 1,952,881 A | 3/1934 | Minter | |
| 1,985,528 A | 12/1934 | Thaheld | |
| 2,656,826 A | 10/1953 | Galuska | |
| 4,050,420 A | 9/1977 | Cataldo | |
| 4,073,474 A | 2/1978 | Hashimoto et al. | |
| 4,142,493 A | 3/1979 | Schira | |
| 4,440,124 A | 4/1984 | Eckert | |
| 5,022,353 A * | 6/1991 | Kamamura | 123/21 |
| 5,197,428 A | 3/1993 | Hornby | |
| 5,205,246 A | 4/1993 | McWhorter | |
| 5,421,301 A | 6/1995 | Fueling | |
| 5,645,029 A | 7/1997 | Ohsuga | |
| 5,758,309 A | 5/1998 | Satoh | |
| 5,957,106 A | 9/1999 | Maloney et al. | |
| 6,009,862 A | 1/2000 | Wanat | |
| 6,314,935 B2 * | 11/2001 | Tanaka et al. | 123/298 |
| 6,336,320 B1 | 1/2002 | Tanaka et al. | |

(Continued)

FOREIGN PATENT DOCUMENTS

WO PCT/US2010/005422 10/2010
WO PCT/US2010/030957 10/2010

*Primary Examiner* — Hieu T Vo (57) ABSTRACT

Fuel is injected into and through the exhaust port and into the cylinder of the piston engine during the time when the flow is reversed from the normally expected flow. The engine is able to operate with some or all of its fuel injected backwards of conventional expectations. In another embodiment the fuel is injected with solid stream injector sprays directed against exhaust valves and ports and deflected into the piston cylinder against the flow of normally aspirated or supercharged engines. This invention can apply to gasoline or diesel cycles and four and two stroke type cycles of engine.

12 Claims, 10 Drawing Sheets

(56) References Cited

U.S. PATENT DOCUMENTS

| | | |
|---|---|---|
| 6,953,024 B2 | 10/2005 | Linna |
| 6,968,831 B2 | 11/2005 | Kim et al. |
| 7,467,614 B2 | 12/2008 | Stewart |
| 8,051,830 B2 * | 11/2011 | Taylor .................. 123/65 P |
| 8,104,450 B2 * | 1/2012 | Gentile .................. 123/298 |
| 8,561,581 B2 * | 10/2013 | Taylor .................. 123/65 A |
| 2002/0046728 A1 | 4/2002 | Tanaka et al. |
| 2002/0134364 A1 | 9/2002 | Miura |
| 2005/0045145 A1 | 3/2005 | Hiraya |
| 2007/0119414 A1 | 5/2007 | Leone |
| 2007/0144470 A1 | 6/2007 | Murase et al. |
| 2008/0060619 A1 | 3/2008 | Allston |
| 2009/0056319 A1 | 3/2009 | Warner et al. |
| 2009/0084094 A1 | 4/2009 | Goss et al. |
| 2011/0088653 A1 | 4/2011 | Gentile |
| 2011/0247584 A1 | 10/2011 | Gentile |
| 2012/0216780 A1 * | 8/2012 | Gentile .................. 123/470 |
| 2012/0222651 A1 * | 9/2012 | Gentile .................. 123/347 |

* cited by examiner

EXHAUST/FUEL

Fig. 18

AIR/FUEL

Fig. 26

FRANCIS CYCLE BACKWARDS INJECTED ENGINE

CROSS REFERENCE TO RELATED APPLICATIONS

This application is a CIP of Ser. No. 12/758,873 filed 2010 Apr. 13 by the present Inventor, now U.S. Pat. No. 8,104,450 B2, issued on 31 Jan. 2012 which is incorporated by reference. This Application claims the benefit of PPA Ser. No. 61/168,625 filed 2009 Apr. 13 by the present Inventor, which is incorporated by reference. This application claims the benefit of PCT Ser. No. PCT/US10/30957 filed 2010 Apr. 14 by the present Inventor, which is incorporated by reference.

BRIEF DESCRIPTION OF THE SEVERAL VIEWS OF THE DRAWINGS

Drawings—Figures

FIG. 6 thru FIG. 10 disclose a 4 stroke poppet valved engine with occurrences in consecutive sequence,

FIG. 6

Near end of Exhaust upstroke, an Intake valve is closed, an Exhaust valve is open, Exhaust gases are driven out said exhaust valve,

FIG. 7

Exhaust Top Dead Center, only said Exhaust valve is open and said Exhaust gases are present in the near areas of an Exhaust tract,

FIG. 8

During Intake downstroke, Inlet and Exhaust valves are open, Fuel has been injected 1 thru said exhaust valve, Fuel could be injected through the intake, (Inlet valve Air+Fuel at mixture ratio of zero to richer than Stochiometric of its own starting gases or the future total mixture ratio of the whole cylinder)+(Exhaust valve Exhaust Regurgitation+Fuel at mixture ratio of zero to richer than Stochiometric of its own starting gases or the future total mixture ratio of the whole cylinder)=Control and Optimization of length of time, temperature, and pressure of future burning,

FIG. 9

During Intake downstroke, Inlet and Exhaust valves are closed. An Increase in Expansion Ratio begins by ending further Inhalation at a cylinder volume less than the full usable cylinder volume which will be used during the following combustion downstroke.

FIG. 10

Bottom Dead Center, Intake downstroke stroke changes to upward Compression stroke.

FIG. 11 thru FIG. 15 disclose a 4 stroke poppet valved engine with occurrences in consecutive sequence,

FIG. 11

Near end of Exhaust upstroke, an Inlet valve opens and an Exhaust valve is open, Exhaust gases are driven into Intake and Exhaust tracts, (In a super charged engine the exhaust valve could be closed to force Exhaust gases against the supercharger into the Intake tract, or to control the exhaust gases driven into the Intake tract)

FIG. 12

Exhaust Top Dead Center, valve overlap condition, both valves open and said Exhaust gases are present in the near areas of the Intake and Exhaust tracts,

FIG. 13

During Intake downstroke, Inlet and Exhaust valves open. Fuel has been injected 1 thru said Exhaust valve, Fuel could be injected through the said Intake valve, ((Inlet valve Exhaust Regurgitation+Fuel at mixture ratio of zero to richer than Stochiometric of its own starting gases or the future total mixture ratio of the whole cylinder)+(Intake Air+Fuel at mixture ratio of zero to richer than Stochiometric of its own starting gases or the future total mixture ratio of the whole cylinder))+(Exhaust valve Exhaust Regurgitation+Fuel at mixture ratio of zero to richer than Stochiometric of its own starting gases or the future total mixture ratio of the whole cylinder)=Control and Optimization of length of time, temperature, and pressure of future burning,

FIG. 14

During Intake downstroke, said Inlet and Exhaust valves are closed, An Increase in Expansion Ratio begins by ending further Inhalation at a cylinder volume less than the full usable cylinder volume which will be used during the following combustion downstroke,

FIG. 15

Bottom Dead Center, Intake downstroke stroke changes to upward Compression stroke.

FIG. 16 thru FIG. 20 disclose a 4 stroke poppet valved engine with occurrences in consecutive sequence,

FIG. 16

Near end of Exhaust upstroke, an Intake valve is closed, an Exhaust valve is open, Exhaust gases are driven thru said Exhaust valve,

FIG. 17

Exhaust Top Dead Center, only the Exhaust valve is open and said Exhaust gases are present in the near areas of an Exhaust tract,

FIG. 18

During Intake downstroke, Only said Exhaust valves are open, Fuel has been injected 1 thru said Exhaust valve, (Exhaust valve Exhaust Regurgitation+Fuel at mixture ratio of zero to richer than Stochiometric of its own starting gases or the future total mixture ratio of the whole cylinder)+

FIG. 19

During Intake downstroke, Only said Inlet valves are open. Fuel could be injected through the said Intake valve, (Intake Air+Fuel at mixture ratio of zero to richer than Stochiometric of its own starting gases or the future total mixture ratio of the whole cylinder)=Control and Optimization of length of time, temperature, and pressure of future burning,

FIG. 20

During Intake downstroke, Inlet and Exhaust valves are closed, An Increase in Expansion Ratio begins by ending further Inhalation at a cylinder volume less than the full usable cylinder volume which will be used during the following combustion downstroke.

FIG. 21 thru FIG. 25 disclose a 4 stroke poppet valved engine with occurrences in consecutive sequence,

FIG. 21

Near end of Exhaust upstroke, an Intake valve is closed, an Exhaust valve is open, Exhaust gases are driven out exhaust valve,

FIG. 22

Exhaust Top Dead Center, only said Exhaust valve is open and Exhaust gases are present in the near areas of an Exhaust tract,

FIG. 23

During Intake downstroke, Only said Exhaust valves are open. Fuel has been injected thru said Exhaust valve, (Exhaust valve Exhaust Regurgitation+Fuel at mixture ratio of zero to richer than Stochiometric of its own starting gases or the future total mixture ratio of the whole cylinder)+

FIG. 24

During Intake downstroke, only Inlet valves are open, Fuel could be injected through the Intake, (Intake Air+Fuel at mixture ratio of zero to richer than Stochiometric of its own starting gases or the future total mixture ratio of the whole cylinder)=Control and Optimization of length of time, temperature, and pressure of future burning,

FIG. 25

During the Compression upstroke the intake valve is open to allow some of the cylinder gases to be sent out of the cylinder back into the intake tract, An Increase in Expansion Ratio occurs by reducing the Inhalation cylinder volume to less than the full usable cylinder volume which will be used during the following combustion downstroke.

Figure 1:
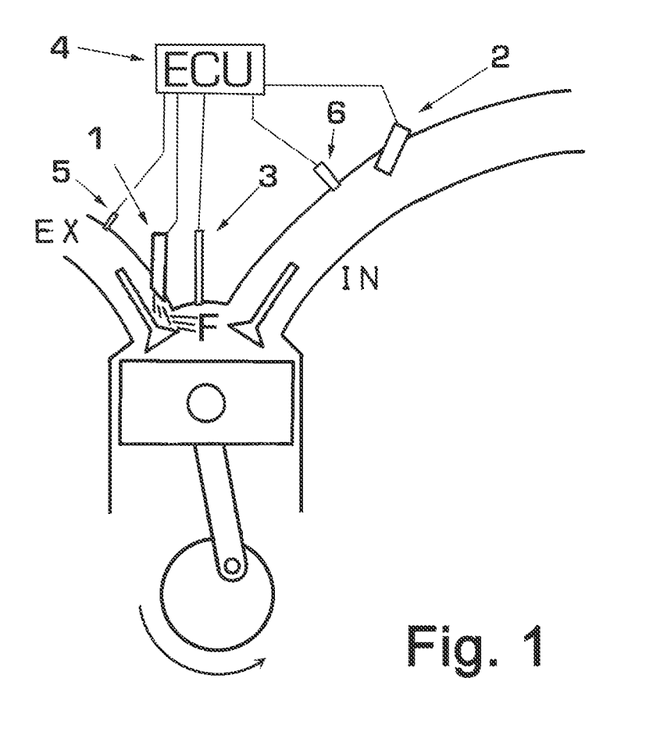
FIG. 1 Shows a System Schematic.
Figure 2:
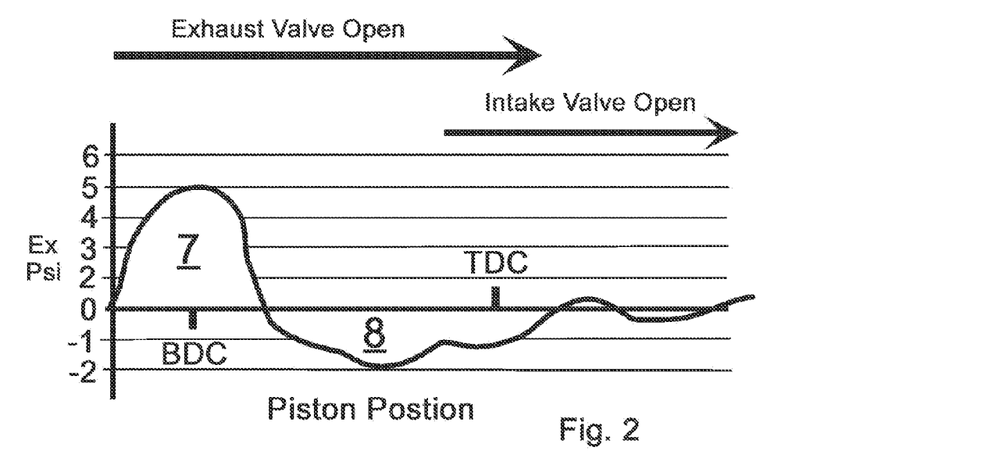
FIG. 2 Shows An example exhaust tract pressure map for a four stroke poppet valve engine is shown as an example in graph FIG. 2.

In one embodiment a piston in an internal combustion engine is pushed down to the bottom of the cylinder which causes the opening of exhaust ports. The pressure in the exhaust piping is positive 7 (FIG. 2) after combustion. The pressure is released in a wave out the exhaust system. After the positive pressure wave comes a negative pressure wave 8 (FIG. 2) which is the Indication of flow known to be capable of bringing exhaust gases back thru the combustion chamber and as far as the intake tract (IN) (FIG. 1). An example exhaust tract pressure map for a four stroke poppet valve engine is shown as an example in graph FIG. 2. In practice the shape of the graph may be difficult to predict and depends on the engine configuration and operating conditions. The waves of energy are sometimes described as caused by the subsonic organ pipe effect of the end of the pipe causing the reflection backwards to its origin based on the length of the pipe. The reflections have also been described by the supersonic shock waves which can emanate from the pressure release of the opening of the exhaust valve and also reflect backwards from the end of the exhaust tube towards the origin at the exhaust valve.

Pressure in the Exhaust tract is an indirect indication of the direction of flow with in the exhaust tract, positive is flow outward from the cylinder and negative pressure into the cylinder which can be cross verified by intake pressure, crankshaft or camshaft position, cylinder pressure. In one embodiment pressure sensors in the exhaust tract 5 (FIG. 1), combustion chamber 3 (FIG. 1), intake tract 6 (FIG. 1) send condition information to the Engine Control Unit (ECU) 4 (FIG. 1). The ECU triggers fuel injectors in the exhaust port 1 (FIG. 1). The ECU can also trigger fuel injector 2 (FIG. 1) on the conventional intake side when conditions are desirable or necessary such as when the engine is cold and starting. For simplicity the other sensors commonly used on fuel injections are not shown in the diagram, but would or could be used, for example, oxygen sensor, knock sensor, air mass sensor, intake temperature, cylinder head temperature, exhaust gas temperature.

Another embodiment of this invention utilizes variations in the fuel delivered from the intake and the exhaust ports to achieve variation in fuel to air ratios that allow ignition while also allowing complete burning without high combustion temperatures which lead to nitrogen oxide formation.

Another embodiment of this invention utilizes different fuels in the Intake versus the exhaust to better achieve the results described in the paragraph above.

Figure 3:
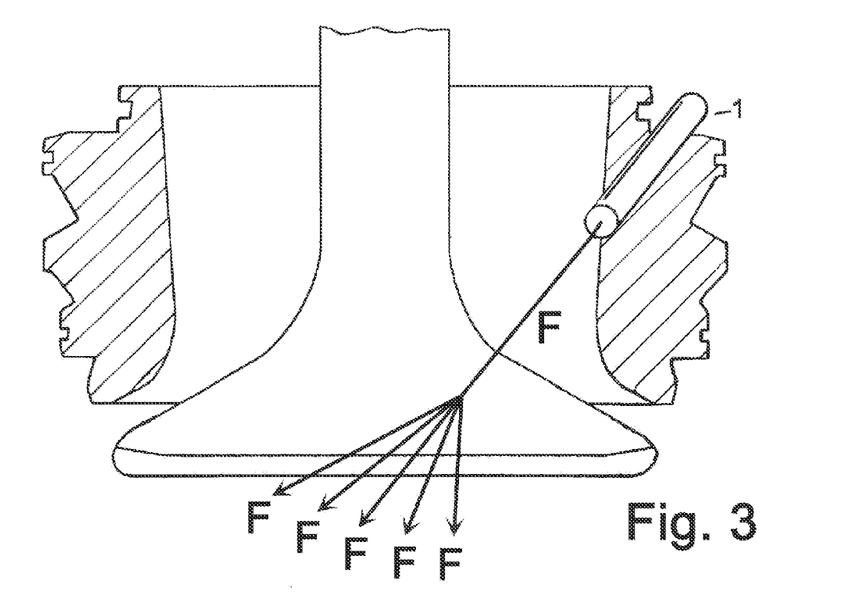
FIG. 3 Shows an embodiment of deflecting solid streams of fuel (F) (or water) onto the exhaust valves.

FIG. 3 shows An embodiment of deflecting solid streams of fuel (F) (or water) onto the exhaust valves to create atomization of fuel, entry of fuel into the combustion chamber against or with the gas flow, cooling of the valve central body.

As velocity decreases over distance more rapidly as droplets form and become smaller, a solid stream therefore maintains the maximum velocity against turbulence and opposite gas flow and therefore is able to oppose and traverse the exhaust gas flow. The impact of the solid stream on the poppet valve produces different liquid sheet angles and the break-up lengths at various angles and locations of impact on different shapes of valves.

Restated, Solid stream nozzles provide the highest impact per unit area. The large free passage design through the typically round solid stream nozzle orifice reduces clogging. In one embodiment a solid stream non-atomized spray directed against the exhaust valve achieves fuel heating and atomization from the deflection impact against the valve and the fuel charge flow against the flow of exhaust gases.

Figure 4:
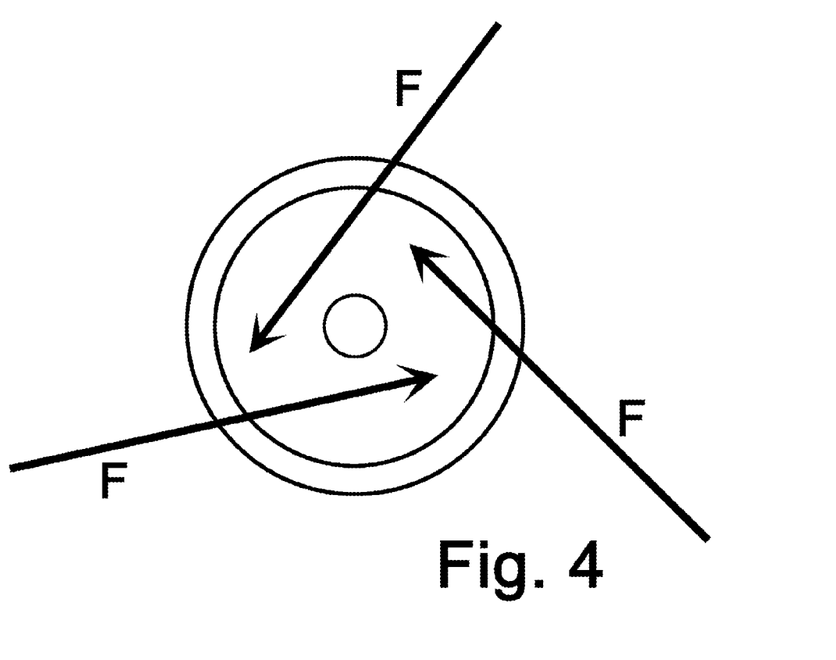
FIG. 4 Shows a view of an exhaust poppet valve from above showing an embodiment with three solid stream fuel (F) injection streams deflected off of evenly distributed points of the valve.

More than one injector can be used to create even thermal conditions in the valve metal which would reduce internal stresses within the metal because of differences in thermal expansion and contraction. FIG. 4 is a view of a exhaust poppet valve from above showing an embodiment with three solid stream fuel (F) injection streams deflected off of evenly distributed points of the valve.

The location of highest heat in the valve are presented in patent U.S. Pat. No. 4,073,474. Heat in the poppet valve periphery that contacts the valve seat is conducted away from the poppet valve. The hot center of the valve disk or head expands the metal against the cooler less thermally expended valve head periphery in contact with the valve seat, resulting in hoop stress and cracks within the valve periphery that contacts the valve seat within the intake tract. In one embodiment of this invention cooling from fuel and or water spray would be best directed upon this hot center of the valve head. Described in alternate language, the solid spray impacts between the beginning of the poppet valve stem and the beginning of the part of the valve periphery which makes contact with the valve seat in the cylinder head.

Fortunately the exhaust valve is typically placed in the cylinder head with a short exit path to the exhaust header, so it maybe possible to perform conversions of existing engines by installing injectors in the exhaust headers. Smaller injectors know as pico injectors are available. Smaller single cylinder engines or engines with separated cylinders allow more direct access to the exhaust valve from many directions and thus are better candidates for inexpensive conversion.

Figure 5:
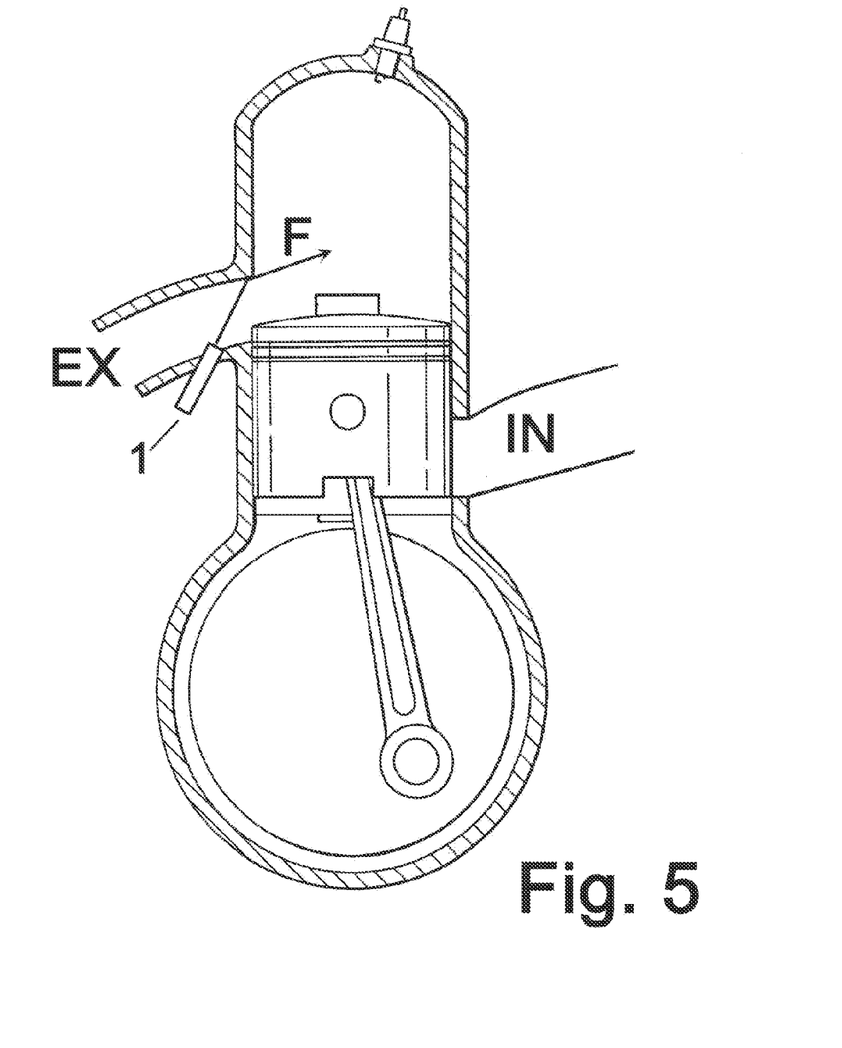
FIG. 5 Illustrates an embodiment of one or more solid stream or non-atomizing fuel injector's 1 injections are deflected against the exhaust tract edge of a piston operated cylinder exhaust valve port and said stream (F) is deflected into said combustion chamber and or cylinder of a two stroke engine.
Figure 6:
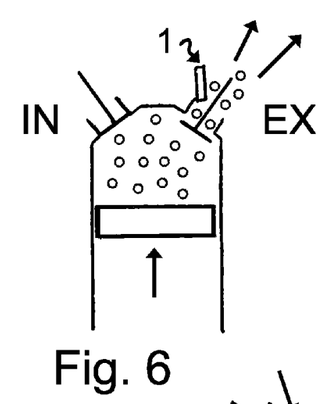
Figure 7:
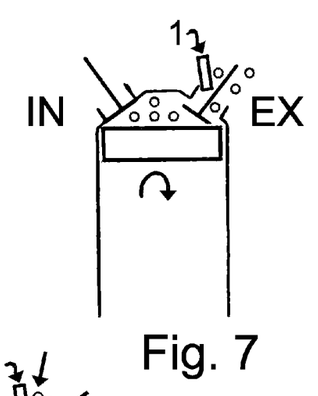
Figure 8:
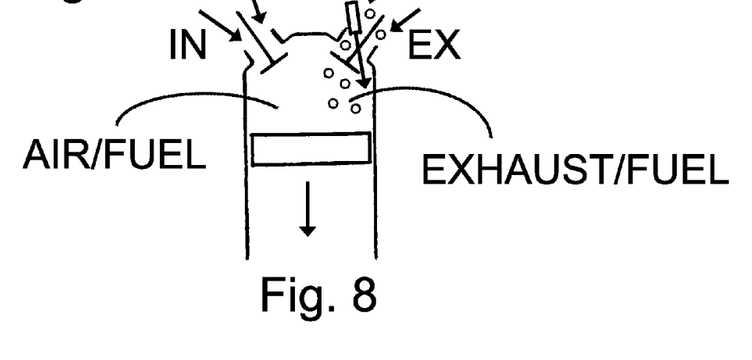
Figure 9:
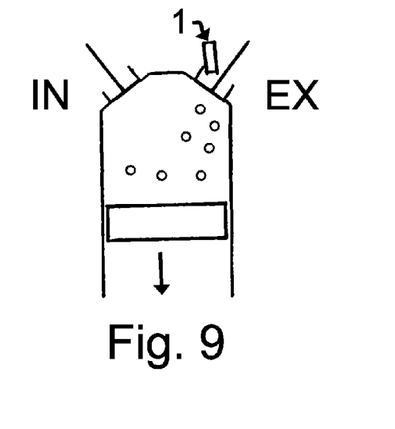
Figure 10:
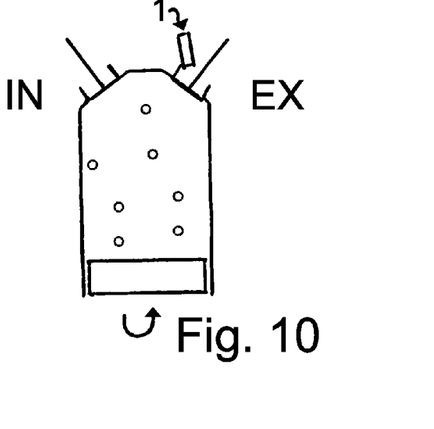
Figures 11, 12, 13:
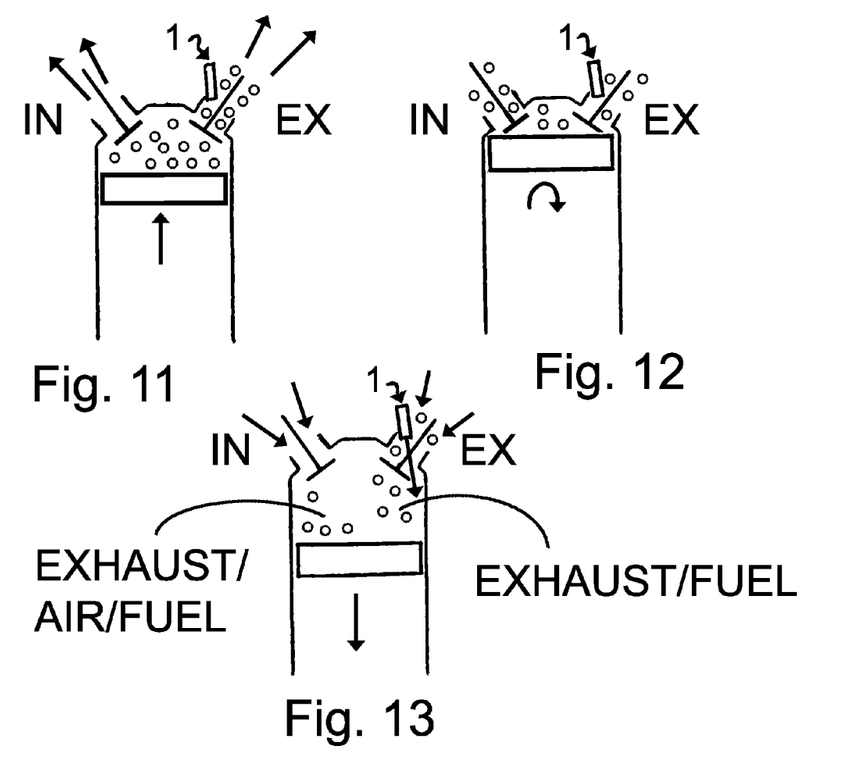
Figure 14:
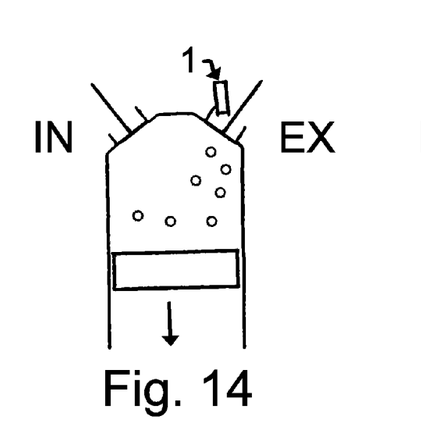
Figure 15:
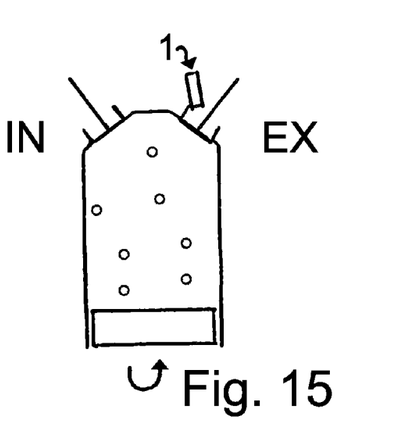
Figure 16:
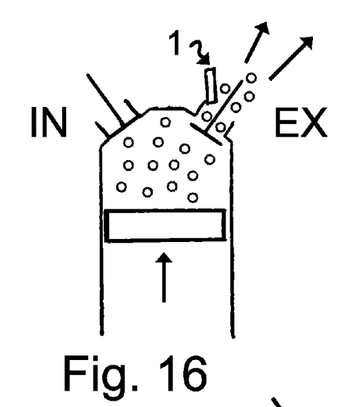
Figure 17:
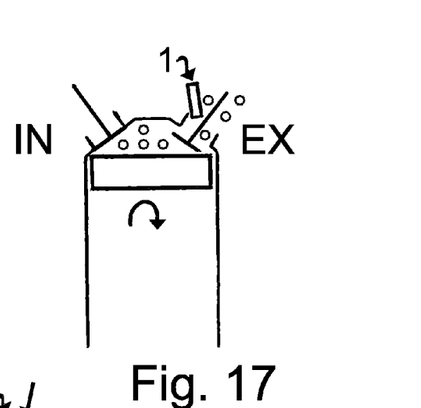

Small two stroke engines present a simpler conversion. FIG. 5 illustrates embodiment of one or more solid stream or non-atomizing fuel injector's 1 injections are deflected against the exhaust tract edge of a piston operated cylinder exhaust valve port and said stream (F) is deflected into said combustion chamber and or cylinder of a two stroke engine.

Copy of Paragraph 3 of the Provisional Patent:

This conception of injecting fuel into the combustion chamber from the exhaust side of the engine is unexpected because conventional expectations do not see flow going this direction. Conventional expectations are also that the injection into this area would cause a back fire or wasted fuel. In some cases fuel is injected into the exhaust port, but it is designed to combust there and flow out the exhaust pipe to provide heating and preparation of the mixture for the catalytic converter. In this invention the fuel is designed to go into the combustion chamber and be burned there for propulsion.

Copy of Paragraph 4 of the Provisional Patent:

The hot surfaces of the exhaust tract and ports and exhaust valves that would normally be considered a structural melting problem are used to heat and make gaseous (volatilize) the liquid fuel which results in better combustion. The fuel spray also serves to cool the problematically hot exhaust valve. Heavier fuels can used because of the hot volatilization. The cooling of the exhaust ports and valves reduces the potential for uncontrolled burning or detonation caused by the hot surfaces and thus suppresses the very reason that this invention would be considered impossible to implement.

Copy of Paragraph 8 of the Provisional Patent:

Another embodiment of this invention utilizes variations in the fuel delivered from the intake and the exhaust ports to achieve variation in fuel to air ratios that allow ignition while also allowing complete burning without high combustion temperatures which lead to nitrogen oxide formation.

Copy of Paragraph 9 of the Provisional Patent:

Another embodiment of this invention utilizes different fuels in the intake versus the exhaust to better achieve the results described in the paragraph above.

Paragraph 10 of the Provisional Patent:

Another embodiment of this invention utilizes water or its vapors or constituent parts of water in the exhaust port injector to cool the cylinder charge and the components of the cylinder itself to achieve the results described in the above.

DEFINITIONS

Definitions
Inlet=Intake
Valve=valves
Poppet Valve=shaped like a tulip, or shaped like the bottom of a stemware wine glass.
Intake pressure=Airmass Sensor=a sensing of engine load with predicts engine breathing efficiency to balance it with versus fuel supplied.
Exhaust=Exhaust Gases.
Backwards Injection=Exhaust valve fuel injection
In most embodiments of piston engines, Inherent Residual Exhaust gases exist, inherent to incomplete scavenging of the leftover unpumped Top Dead Center combustion space, wave action, Some Internal EGR is inherent to almost all engines. Supercharging across the valve overlap can avoid inherent residual loss of fuel to the exhaust tract.

In most embodiments of piston engines: Combustion reburning of exhaust gases by same engine=Exhaust Gas Recirculation=EGR, in most cases the exhaust is piped externally from the exhaust to the intake.

In most embodiments of piston engines: Internal Exhaust Gas Recirculation=Residual Exhaust Gases left in the cylinder between cycles.

In some embodiments of piston engines: Internal Exhaust Gas Recirculation=Exhaust Gas Regurgitation where the Exhaust gases are expelled from the cylinder and then re-inhaled between cycles.

Engines may or may not have=Cooled exhaust gas recirculation

Stratified Charge=different fuel and gas properties within the combustion chamber.

Stratified Charge=more than one gas fuel mixture burned in the same space=rich and Lean Burning=Lean, Stochiometric, Rich, EGR=Exhaust, Intake, Direct Injections=Steps in consecutive combustion=longer burn time=barriers to Fast Burning.

PreIgnition=Auto ignition=Knock which may lead to:

Fast Burning=Explosion=Detonation instead of deflagration.

Increase in Expansion Ratio: An Increase in Expansion Ratio can occur by reducing the Intake cylinder volume to less than the full usable cylinder volume which will be used during the following combustion downstroke.

Direct Injection is another source of fuel that enters the engine without going thru the intake and exhaust system. Direct Injection could be added to the embodiments in this disclosure.

In embodiments primarily of four stroke engines the inventions Exhaust valve fuel injection enables having mixture control more independent of the intake air and Intake valve timing without the need for direct injection.

Kits made up of ECU and injection systems and exhaust headers may be packaged for application in manufacturing engines and conversion of existing engines.

Exhaust valve fuel injection improves on the ability of Exhaust Gas Recirculation to occur internally, inherently using the already existing engine intake and exhaust valves and pistons without an additional external separate circuit and mechanisms.

Exhaust valve fuel injection improves on the ability to make the expansion ratio of the engine greater than the piston and cylinders compression ratio as calculated by piston sweep and cylinder volumes alone. In the vernacular it is having the engine doing less, so the engine has more time to extract more per unit of fuel, an increase in efficiency commonly credited to Atkinson, the Atkinson cycle. The engine puts out less power but remains the same weight but it is simple to make as it uses the same number and type of parts as ordinary engines.

Exhaust valve fuel injection improves on the ability to combine increases in the expansion ratio over the calculated compression ratio with improvements in internal Inherent Exhaust Gas Recirculation combined with improvements in mixture control more independent of the intake air and intake valve timing.

If valve timing is varied during engine operation all of the embodiments can be optimized for conditions and can be accomplished without the pumping losses of a variable intake restrictor throttle.

Exhaust valve fuel injection enables one to abandon the use of restriction throttles and external exhaust gas recirculation systems. One may or may not get rid of intake injection and direct injection systems. The potential utility of variable valve timing increased. The variable valves allow throttling the engine by use of more internal residual exhaust and fuel supplied from the exhaust valve and tiny amounts of air and fuel from the intake valve. The different stratified cylinder charge from the intake and exhaust valve create a longer duration lower peak pressure burning of a stratified charge mixture of air and exhaust recirculated gases.

Drawing figures illustrate other sequences of 4 stroke engine events, for example the order FIGS. 16, 21, FIGS. 17, 22, FIG. 13, FIG. 14, FIG. 15 is possible.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

Figure 18:
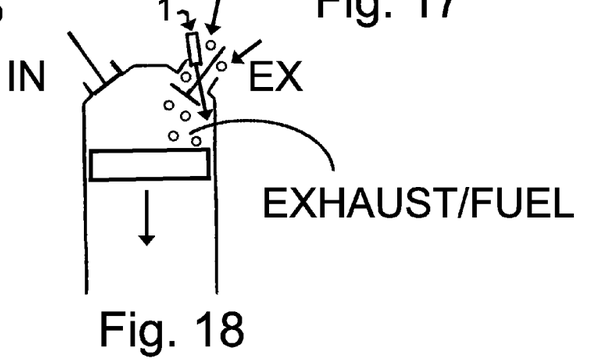
Figure 19:
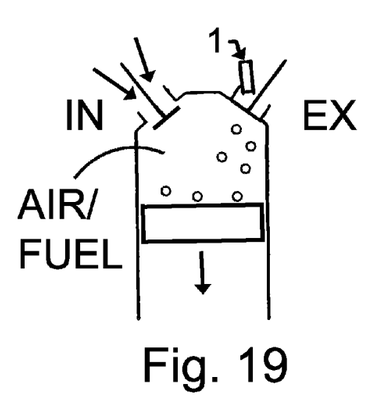

I claim:

1. A 4 stroke poppet valved piston supercharged or naturally aspirated internal combustion engine with separate intake and exhaust valves with substantially and continuously separate exhaust and intake tracts leading separately to the atmosphere, whose exhaust tract is of a length and continuity where no substantial fresh air would flow backwards down said exhaust tract into the combustion chamber as a result of common pressure waves, wherein the fuel is forcibly injected from within the exhaust tract into said combustion chamber thru said open exhaust valve port into said combustion chamber and cylinder for the next cycle of combustion thru said exhaust valve of said combustion chamber or said cylinder from a distance from said exhaust valve equal to less than 10 diameters of the circle equivalent two dimensional sectional area of said exhaust valve tract and face opening junction, during the moments while said exhaust valve is open wherein:
   a. near the end of the piston's exhaust cycle upstroke, the intake valve or valves remain closed, and said exhaust valves remain open, while exhaust gases are driven thru said exhaust valves, into the exhaust tract as schematically represented by bubbles in (FIG. 16)
   b. upon said piston's exhaust cycle top dead center, said intake valve remain closed and said exhaust valve remains open and said exhaust gases are present in the near areas of an exhaust tract (FIG. 17),
   c. during said piston's subsequent intake downstroke, while said intake valves remain closed and said exhaust valves remain open, fuel is injected thru said exhaust valve or valves into said cylinder and said combustion chamber represented schematically by injector (1) with arrow of fuel (FIG. 18),
   d. subsequently during said piston's intake downstroke, said inlet valve or valves are opened at substantially at the same time as said exhaust valves are closed (FIG. 19),
   e. subsequently near intake bottom dead center said inlet valve or valves close, followed by compression upstroke, compression top dead center, combustion and combustion downstroke,
   f. near the bottom dead center of said piston's combustion down stroke said exhaust valves open and the exhaust upstroke begins and the cycle repeats at step a above.

Figure 20:
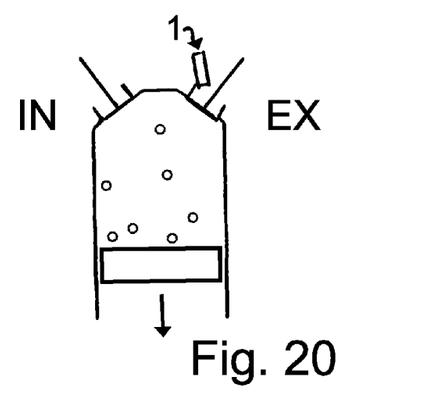
Figure 21:
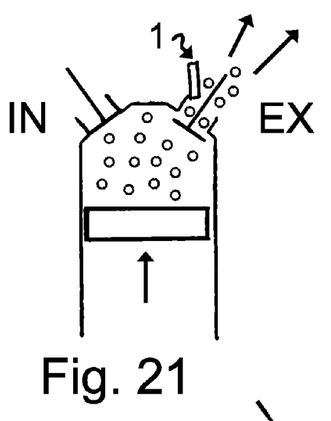
Figure 22:
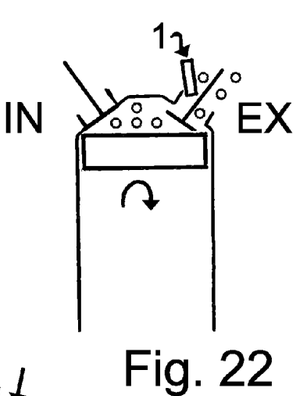
Figure 23:
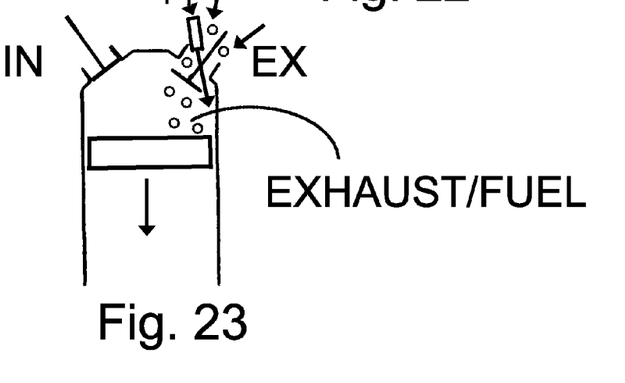
Figure 24:
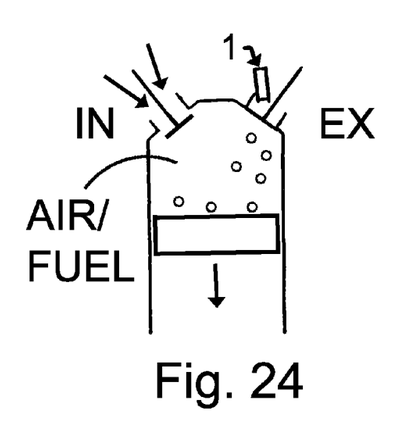
Figure 25:
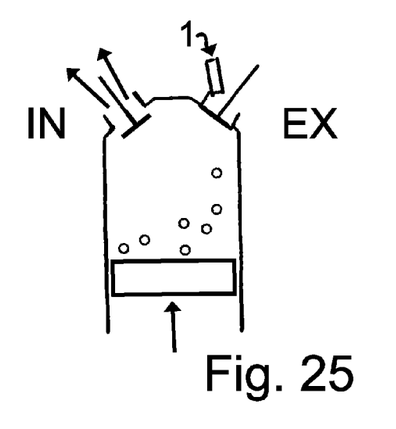

2. A 4 stroke poppet valved piston supercharged or naturally aspirated internal combustion engine with separate intake and exhaust valves with substantially and continuously separate exhaust and intake tracts leading separately to the atmosphere, whose exhaust tract is of a length and continuity where no substantial fresh air would flow backwards down said exhaust tract into the combustion chamber as a result of common pressure waves, wherein the fuel is forcibly injected from within the exhaust tract into said combustion chamber thru said open exhaust valve port into said combustion chamber and cylinder for the next cycle of combustion thru said exhaust valve of said combustion chamber or said cylinder from a distance from said exhaust valve equal to less than 10 diameters of the circle equivalent two dimensional sectional area of said exhaust valve tract and face opening junction, during the moments while said exhaust valve is open wherein:
   a. near the end of the piston's exhaust cycle upstroke, the intake valve or valves remain closed, and said exhaust valves remain open, while exhaust gases are driven thru said exhaust valves, into the exhaust tract as schematically represented by bubbles in (FIG. 16)
   b. upon said piston's exhaust cycle top dead center, said intake valve remain closed and said exhaust valve remains open and said exhaust gases are present in the near areas of an exhaust tract (FIG. 17),
   c. during said piston's subsequent intake downstroke, while said intake valves remain closed and said exhaust valves remain open, fuel is injected thru said exhaust valve or valves into said cylinder and said combustion chamber represented schematically by injector (1) with arrow of fuel (FIG. 18),
   d. subsequently during said piston's intake downstroke, said inlet valve or valves are opened at substantially at the same time as said exhaust valves are closed (FIG. 19),
   e. subsequently fuel is injected (from the intake tract) through said open intake valves into said cylinder and said combustion chamber (FIG. 19),
   f. subsequently during said piston's intake downstroke before nearing intake bottom dead center, said Inlet and Exhaust valves are closed, ending further Inhalation at a cylinder volume less than the full usable cylinder volume (FIG. 20),
   g. all of the said cylinder valves remain closed during said pistons subsequent intake bottom dead center, compression upstroke, compression top dead center, combustion and combustion downstroke
   h. near the bottom dead center of said piston's combustion down stroke said exhaust valves open and the exhaust upstroke begins and the cycle repeats at step a above.

Figure 26:
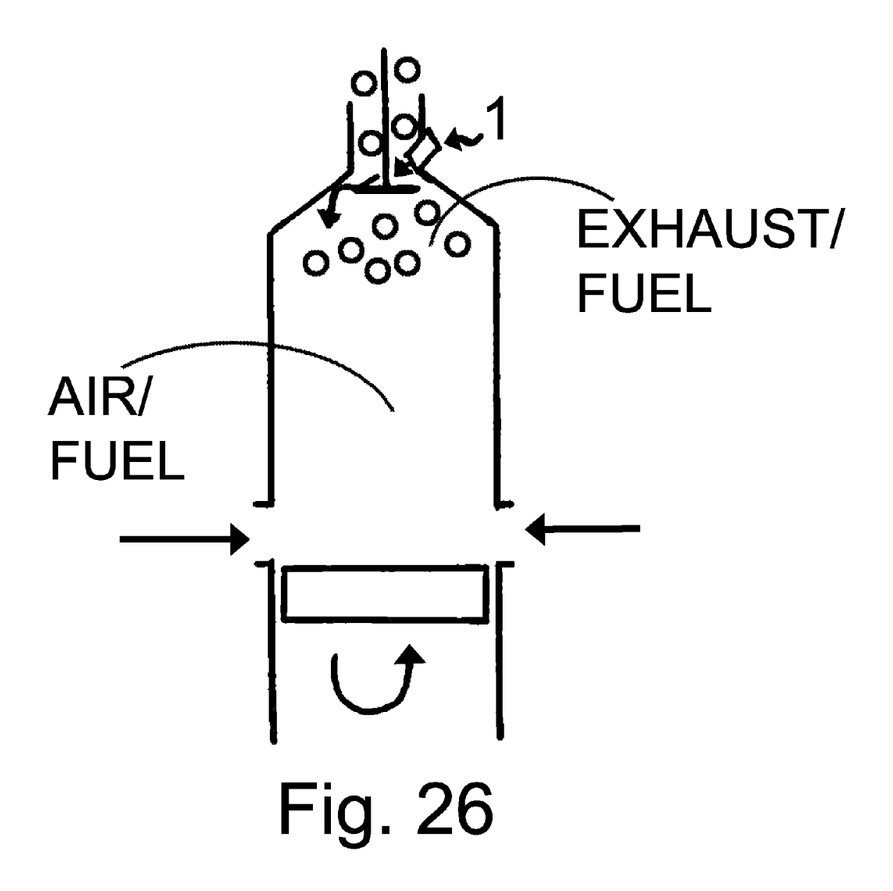
FIG. 26 is a Supercharged Two Stroke Engine with a poppet exhaust valve and a cylinder piston port valve intake, Fuel is injected against the flow of exhaust, (Intake Air+Fuel at mixture ratio of zero to richer than Stochiometric of its own starting gases or the future total mixture ratio of the whole cylinder)+(Exhaust valve Exhaust Regurgitation+Fuel at mixture ratio of zero to richer than Stochiometric of its own starting gases or the future total mixture ratio of the whole cylinder)=Control and Optimization of length of time, temperature, and pressure of future burning.

3. A supercharged piston 2 stroke cycle piston intake port valved, poppet exhaust valved combustion engine whose individual cylinder or cylinders have cylinder poppet exhaust valves and whose cylinders have cylinder wall port intake valves operated by the passage of the piston itself (FIG. 26) with substantially and continuously separate exhaust and intake tracts leading separately to the atmosphere, whose exhaust tract is of a length and continuity where no substantial fresh air would flow backwards down said exhaust tract into the combustion chamber as a result of common pressure waves, wherein the fuel is forcibly injected from within the exhaust tract into said combustion chamber thru said open exhaust valve port into said combustion chamber and cylinder for the next cycle of combustion thru said exhaust valve of said combustion chamber or said cylinder represented schematically by injector (1) with arrow of fuel (FIG. 26) from a distance from said exhaust valve equal to less than 10 diameters of the circle equivalent two dimensional sectional area of said exhaust valve tract and face opening junction, during the moments while said exhaust valve is open wherein: during the post combustion downstroke said exhaust poppet valve is opened before piston inlet valves open and fuel is injected thru said exhaust valve with the flow of gasses, and fuel is injected against the flow of gasses after said piston inlet valves are opened, said exhaust poppet valve or valves are closes before all exhaust gasses have been pushed out the cylinder, subsequently said piston travels past bottom dead center and upward to close said cylinder port valves to begin the compression of the charge to combust and begin another cycle as above.

4. The engine of claim 1 or 2 or 3 where the type of fuel injected in the exhaust tract is water and the fuel injected in the intake tract is gasoline.

5. The engine of claim 1 or 2 or 3 where the type of fuel injected in the exhaust tract is a lower pump gasoline octane rating than the pump gasoline octane rating of the intake tract gasoline.

6. The engine of claim 1 or 2 or 3 where the type of fuel injected in the exhaust tract is a higher pump gasoline octane rating than the pump gasoline octane rating of the intake tract gasoline.

7. A method of controlling combustion and the combustion cycle in a supercharged or naturally aspirated 4 stroke poppet valved piston supercharged or naturally aspirated internal combustion engine with separate intake and exhaust valves with substantially and continuously separate exhaust and intake tracts leading separately to the atmosphere, whose exhaust tract is of a length and continuity where no substantial fresh air would flow backwards down said exhaust tract into the combustion chamber as a result of common pressure waves, wherein the fuel is forcibly injected from within the exhaust tract into said combustion chamber thru said open exhaust valve port into said combustion chamber and cylinder for the next cycle of combustion thru said exhaust valve of said combustion chamber or said cylinder from a distance from said exhaust valve equal to less than 10 diameters of the circle equivalent two dimensional sectional area of said exhaust valve tract and face opening junction, during the moments while said exhaust valve is open with the steps of:
   a. driving exhaust gases thru said exhaust valve or valves which remain open into said exhaust tract, near the end of the piston's exhaust upstroke, while the intake valve or valves remain closed as schematically represented by bubbles in (FIG. 16),
   b. changing the direction of the pistons travel near and upon the piston's exhaust top dead center, said intake valves remaining closed and said exhaust valves remaining open and said exhaust gases remaining in the near areas of an exhaust tract (FIG. 17),
   c. Injecting fuel thru said exhaust valve or valves into said cylinder and said combustion chamber, during said piston's subsequent intake downstroke, said intake valves remaining closed and said exhaust valves remaining open represented schematically by injector (1) with arrow of fuel (FIG. 18),
   d. opening said inlet valve or valves while substantially at the same time closing said exhaust valves during said piston's intake downstroke (FIG. 19),
   e. Injecting fuel through said open intake valves into said cylinder and said combustion chamber,
   f. moving said piston to near intake bottom dead center, closing said inlet valve or valves, followed by subsequent compression upstroke, compression top dead center and combustion downstroke,
   g. moving said piston to near bottom dead center of said piston's combustion down stroke opening said exhaust valves beginning the exhaust upstroke repeating said cycle at a above.

8. A method of controlling combustion and the combustion cycle in a supercharged or naturally aspirated 4 stroke poppet valved piston supercharged or naturally aspirated internal combustion engine with separate intake and exhaust valves with substantially and continuously separate exhaust and intake tracts leading separately to the atmosphere, whose exhaust tract is of a length and continuity where no substantial fresh air would flow backwards down said exhaust tract into the combustion chamber as a result of common pressure waves, wherein the fuel is forcibly injected from within the exhaust tract into said combustion chamber thru said open exhaust valve port into said combustion chamber and cylinder for the next cycle of combustion thru said exhaust valve of said combustion chamber or said cylinder from a distance from said exhaust valve equal to less than 10 diameters of the circle equivalent two dimensional sectional area of said exhaust valve tract and face opening junction, during the moments while said exhaust valve is open with the steps of:
   a. driving exhaust gases thru said exhaust valve or valves which remain open into said exhaust tract, near the end of the piston's exhaust upstroke, while the intake valve or valves remain closed as schematically represented by bubbles in (FIG. 16),
   b. changing the direction of the pistons travel near and upon the piston's exhaust top dead center, said intake valves remaining closed and said exhaust valves remaining open and said exhaust gases remaining in the near areas of an exhaust tract (FIG. 17),
   c. Injecting fuel thru said exhaust valve or valves into said cylinder and said combustion chamber, during said piston's subsequent intake downstroke, said intake valves remaining closed and said exhaust valves remaining open represented schematically by injector (1) with arrow of fuel (FIG. 18),
   d. opening said inlet valve or valves while substantially at the same time closing said exhaust valves during said piston's intake downstroke (FIG. 19),
   e. Injecting fuel through said open intake valves into said cylinder and said combustion chamber,
   f. closing said inlet and Exhaust valves, during said piston's intake downstroke before nearing intake bottom dead center, ending further Inhalation at a cylinder volume less than the full usable cylinder volume (FIG. 20),
   g. moving said piston to intake bottom dead center while all of said cylinder valves remain closed during said pistons subsequent compression upstroke, compression top dead center and combustion downstroke,
   h. moving said piston to near bottom dead center of said piston's combustion down stroke opening said exhaust valves beginning the exhaust upstroke repeating said cycle at a above.

9. A method of controlling combustion and its combustion cycle in a supercharged piston 2 stroke cycle piston port intake valved, poppet exhaust valved combustion engine whose individual cylinder or cylinders have cylinder poppet exhaust valves and whose cylinders have cylinder wall port intake valves operated by the passage of the piston itself (FIG. 26) with substantially and continuously separate exhaust and intake tracts leading separately to the atmosphere, whose exhaust tract is of a length and continuity where no substantial fresh air would flow backwards down said exhaust tract into the combustion chamber as a result of common pressure waves wherein the fuel is forcibly injected from within the exhaust tract into said combustion chamber thru said open exhaust valve port into said combustion chamber and cylinder for the next cycle of combustion thru said exhaust valve of said combustion chamber or said cylinder represented schematically by injector (1) with arrow of fuel (FIG. 26) from a distance from said exhaust valve equal to less than 10 diameters of the circle equivalent two dimensional sectional area of said exhaust valve tract and face opening junction, during the moments while said exhaust valve is open with the steps of:
   a. opening one or more poppet exhaust valves before piston inlet valves open, during the downstroke b. injecting fuel thru said exhaust poppet valve with the flow of gasses, injecting fuel against the flow of gasses after said piston inlet cylinder port valves are opened, c. closing said exhaust poppet valve closes before all exhaust gasses have been pushed out the cylinder, d. continuing said piston travel past bottom dead center and upward to close said cylinder port valves to begin the compressing of the charge and combusting and beginning another cycle at a above.

10. The engine of claim 7 or 8 or 9 where the type of fuel injected in the exhaust tract is water and the fuel injected in the intake tract is gasoline.

11. The engine method of claim 7 or 8 or 9 where the type of fuel injected in the exhaust tract is a lower pump gasoline octane rating than the pump gasoline octane rating of the intake tract gasoline.

12. The engine method of claim 7 or 8 or 9 where the type of fuel injected in the exhaust tract is a higher pump gasoline octane rating than the pump gasoline octane rating of the intake tract gasoline.

* * * * *